Patented Mar. 5, 1929.

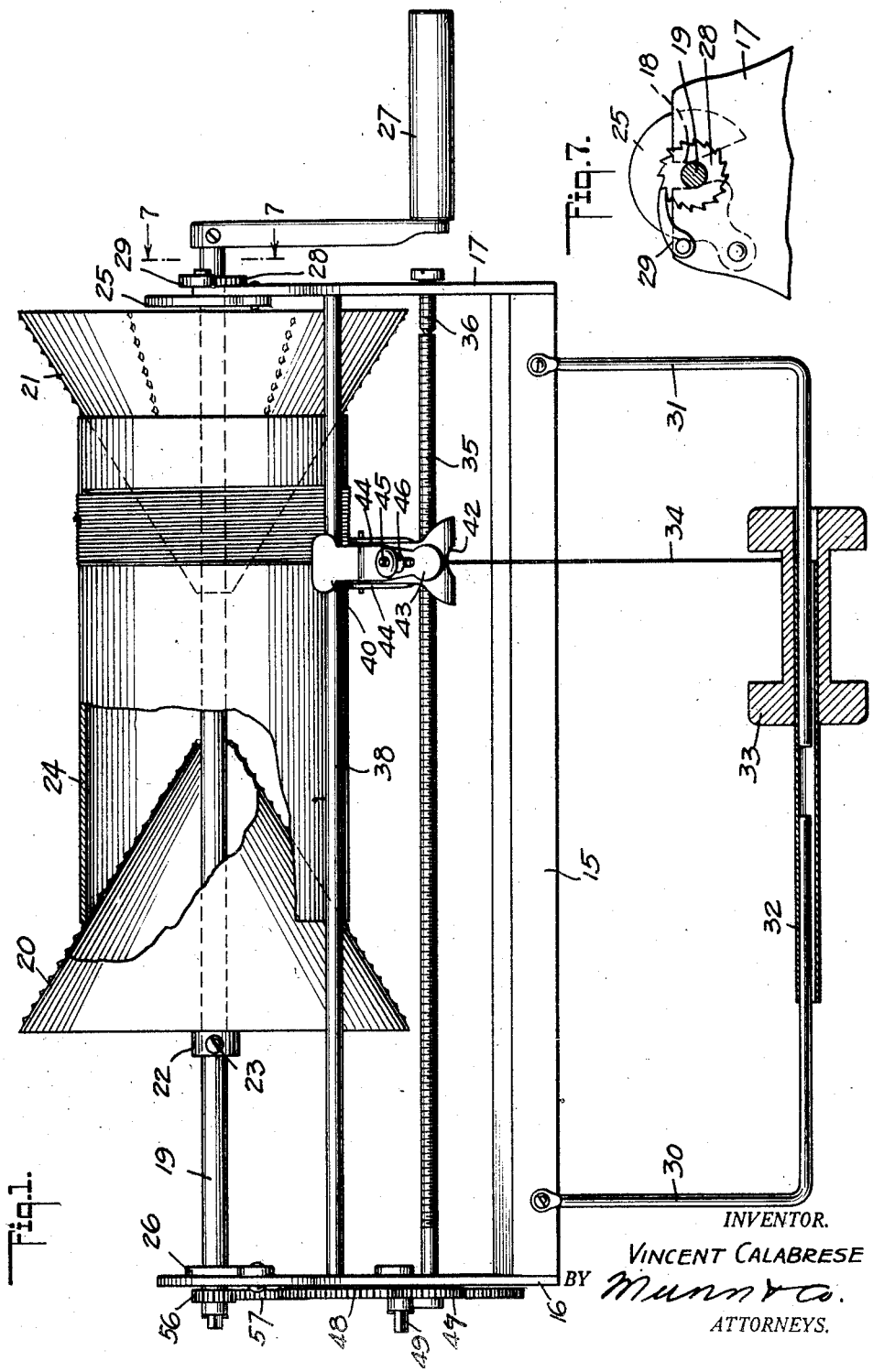

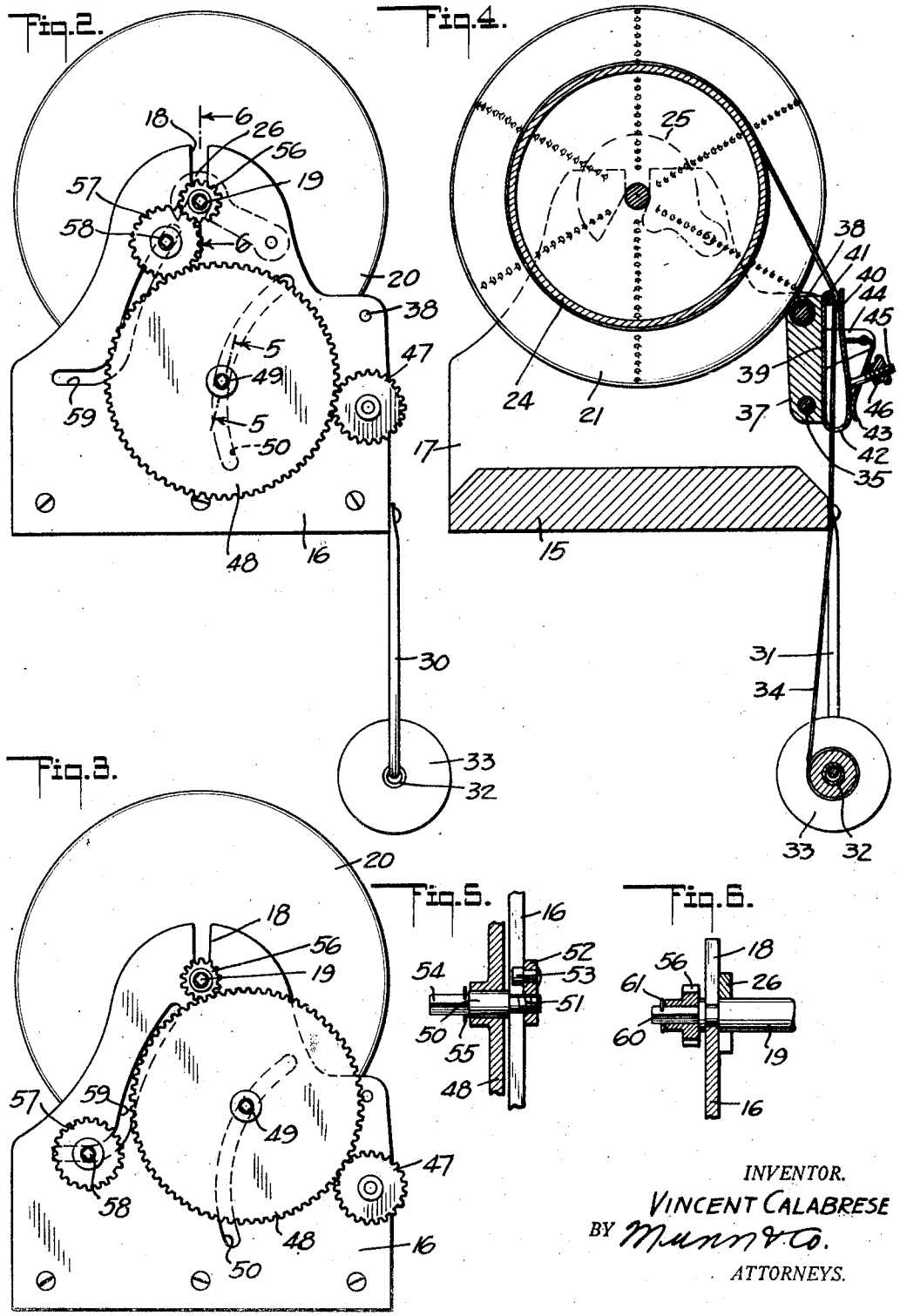

1,704,166

UNITED STATES PATENT OFFICE.

VINCENT CALABRESE, OF LOS ANGELES, CALIFORNIA, ASSIGNOR TO JOE CUCCIO.

WIRE-WINDING MACHINE.

Application filed April 1, 1925, Serial No. 19,939. Renewed May 8, 1928.

My invention relates to machines for winding spools, coils, resistances and all similar windings where bare or insulated wire is spirally applied to a core or spool.

It is the purpose of my invention to provide a wire winding machine particularly adapted, although not necessarily, for the winding of tuning coils as used in radio apparatus, my invention being designed as a hand operated machine of an extremely simple, inexpensive and durable construction for use in small radio shops.

It is also a purpose of my invention to provide a wire winding machine embodying automatic wire feeding and tensioning means, and means by which said means can be moved in either direction whereby coils can be wound in one direction or the other.

I will describe only one form of wire winding machine embodying my invention, and will then point out the novel features thereof in claims.

In the accompanying drawings,

Figure 1 is a view showing in front elevation one form of wire winding machine embodying my invention with a portion thereof broken away.

Figure 2 is a view showing in end elevation the machine shown in Figure 1.

Figure 3 is a view similar to Figure 2 showing another position of the gearing shown in Figure 2.

Figure 4 is a central vertical sectional view through the feeding and tensioning mechanism.

Figures 5 and 6 are views taken on the lines 5—5 and 6—6, respectively, of Figure 2.

Figure 7 is a fragmentary view showing in side elevation one end of the machine.

Similar reference characters refer to similar parts in each of the several views.

Referring specifically to the drawings, my invention in its present embodiment comprises a base 15 to the opposite ends of which are secured uprights 16 and 17 in the form of plates having vertical slots 18 which rotatably receive the opposite ends of a shaft 19. As clearly shown in Figure 1, the shaft 19 is provided with a pair of conical supporting members 20 and 21 arranged with their small ends in confronting relation to each other, the member 21 being permanently fixed to the shaft while the member 20 is removably fixed to the shaft by means of a collar 22 provided with a set screw 23. By the collar and set screw, it will be clear that the supporting member 20 is capable of being adjusted longitudinally on the shaft and secured in any adjusted position whereby its position with relation to the member 21 can be varied as desired to accommodate a tubular support 24 which latter constitutes a conventional mounting for the coil wire in radio tuning devices.

In reality, the tubular support 24 constitutes a reel on which the coil of wire is adapted to be formed, and in order to apply the tubular support between the conical supporting members, it is necessary that the shaft 19 be removable from the uprights 16 and 17. To this end the shaft ends are removably secured within the slots 18 by latches 25 and 26 pivoted on the uprights to occupy latching positions as shown wherein they embrace the ends of the shaft and retain the latter against upward displacement from the uprights. As illustrated to advantage in Figure 7, the latch 25 is such as to project above the upright 17 when in latching position so that it is readily accessible to be swung upwardly to non-latching position. It will be understood that the latch 26 is at all times accessible by virtue of the spaced relation of the conical member 20 with respect to the upright 16.

The shaft 19 is adapted to be manually rotated through the medium of a crank 27 secured to the right hand end of the shaft. As the shaft is adapted to be rotated at all times in one direction, I have provided the crank end of the shaft with a ratchet wheel 28 engaged by a pivoted pawl 29 which co-operates with the latter to prevent retrograde rotation of the shaft, as will be understood.

As clearly shown in Figure 1, a pair of L shaped arms 30 and 31 are pivotally supported in depending relation with respect to the base 15, and their horizontal portions are connected by a sleeve 32 which is telescoped on the confronting ends of the arms and to provide support for a reel 33 on which is wound a wire 34 to be fed and ultimately coiled on the tubular support 24. The reel 33 is loosely fed on the sleeve 32 so that the reel is free to move longitudinally thereon and in order that the latter may respond to the lateral movement of the wire 34 during the feeding operation.

For feeding the wire from the reel to the tubular support in such manner that the wire will be coiled on the support, I have provided a screw threaded shaft 35 journaled at one end in the upright 16 and rotatably supported at the other end by a pointed screw 36 threadedly mounted in the upright 17. A block or carriage 37 threadedly engages the shaft 35 so that when the shaft is rotated, it is fed longitudinally thereof and parallel to the shaft 19. This carriage 37 is guided in its movement by means of a rod 38 fixed to the uprights 16 and 17 above the shaft 35 and extending loosely through the carriage as illustrated in Figure 4. As shown in Figure 4, a wire guide is secured to the carriage 37, such guide in the present instance comprising a plate 39 of resilient material bent upon its ends to provide a resilient tongue 40 which is normally urged into engagement with a bead 41 formed by curling the upper edge of the plate 39. At the junction of the plate and tongue, a slot 42 is formed through which the wire 34 is adapted to extend so that the latter can pass between the bead 41 and the tongue 40 in order that the tension of the tongue can be exerted on the wire to insure a universal feeding of the wire from the reel to the tubular support. The tongue 40 is normally urged to the position shown in Figure 4 by means of a lever 43 fulcrumed on and between a pair of ears 44 formed on the plate 38. With this manner of lever, it will be understood that it can be moved so as to disengage the tongue 40 and thus permit the latter to spring to released position with respect to the wire 34. In order that the pressure exerted by the tongue on the wire can be varied as desired, the tongue is provided with a stud 45 which extends through a suitable opening formed in the lever 43 where it is screw threaded to receive a nut 46, the nut engaging the lever so that by feeding the nut inwardly the lever can be moved to increase the tension of the tongue and thereby increase the tension exerted on the wire 34. In this manner the proper feeding of the wire from the reel to the tubular support can be insured so that the convolutions formed on the tubular support will snugly embrace the latter.

Referring now to Figures 2 and 3, I have here shown one form of mechanism for driving the screw shaft 35 from the main shaft 19. This mechanism comprises in the present instance a pinion 47 fixed to the projecting end of the screw shaft 35 and constantly meshing with a relatively large gear 48 rotatably mounted on a pintle 49 movable in a slot 50 of the upright 16. As clearly shown in Figure 5, the pintle 49 is provided with a threaded extension 51 on which is mounted a nut 52 carrying a lug 53 disposed in the slot 50 and operating to prevent rotation of the nut on the extension. The opposite end of the pintle 49 is formed with a squared head 54 through which is extended a pin 55 for removably securing the gear 48 on the pintle, it being understood that the gear is interposed between the upright 16 and the pin. A suitable key (not shown) can be applied to the head 54 for rotating the pintle 49 so as to bring the nut 52 into clamping engagement with the upright 16 whereby the pintle proper is clamped to the upright and thus secured against movement in the slot so as to hold the gear 48 against movement bodily but to permit rotation of such gear about the pintle as an axis. It will be understood that by reversing the direction of rotation of the pintle through the medium of the key, the nut 52 will no longer clamp the upright so that the gear is free to be adjusted within the slot.

A pinion 56 is fixed to the projecting end of the shaft 19, and as shown in Figure 2 this pinion meshes with the larger pinion 57 mounted on a pintle 58 constructed in the same manner as the pintle 49 and provided with an identical clamping nut by which the pintle can be secured at any point along the length of a slot 59 formed in the upright 16. This pinion 57 meshes with the gear 48 so that by rotation of the shaft 19, the pinion 47 will be operated to rotate the screw shaft 35 in a direction opposed to the direction of rotation of the shaft 19. In this manner, the carriage 37 together with the wire tensioning mechanism is moved to the ratchet along the screw shaft as when viewed in Figure 1. Should it be desired to move the carriage in the opposite direction to form a coil of wire on the tubular support which is reversely wound with respect to the coil formed in moving the carriage in the first direction, the pintles 49 and 58 are accommodated to release the gears 48 and 57 so as to permit movement of the gear 48 to the elevated position shown in Figure 3 wherein it maintains engagement with the pinion but now engages the pinion 56, while the pinion 57 is moved downwardly of the slot 59 out of mesh with the pinion 57 and the gear 48. By the elimination of the pinion 57 from the train of gearing, it will be clear that with rotation of the pinion 47 the screw shaft will be rotated in the same direction as the main shaft 19. Referring to Figure 6 it will be seen that the pinion 56 is removable from a squared end 60 of the shaft 19 by removal of a pin 61. By virtue of the adjustability of the gear 48, it will be clear that pinions of larger or smaller diameter than the pinion 56 can be applied to the shaft 19 and maintained in meshing relation to the gear 48 by an adjustment of the latter in the slot 50. In this manner the reel rotational speeds of the shafts 19 and 35 in one direction can be varied as desired. To vary the reel rotational speeds in opposite directions as when considering Figure 2, it will be clear that the pinion 57 can be removed and others of larger or smaller diameter substituted so as to be interposed between the pinion 56 and the gear 48. Thus the driving mechanism provides means by which the screw shaft 35 can be rotated in the same or reverse direction with respect to the shaft 19 and at any relative speed so as to feed the carriage in one direction or the other along the screw shaft and at any desired speed.

The operation of the machine is as follows: To apply a tubular support 24 to the supporting members 20 and 21 it is, of course, necessary that the shaft 19 be removed from the uprights and the member 20 removed from the shaft whereby the tubular support can be placed on the shaft and into contact with the conical supporting member 21. Following this operation, the supporting member 20 as applied to the shaft and secured in such position as to co-operate with the member 21 in clamping the support 24 between the two members so that when the shaft 19 is rotated the corresponding movement will be imparted to the tubular support. In order to prevent slippage of the tubular support on the conical members the latter are formed with protuberances 62 preferably arranged as shown so as to provide means for locating the tubular support against circumferential movement on the supporting members. By training the wire 34 from the reel 33 through the tensioning device and securing the free end of the wire or holding the same on the tubular support, the machine is now ready for operation. By rotating the shaft 19 through the medium of the crank, rotation of the tubular support is effected to cause a continuous feeding of the wire from the reel 33 and thus forming convolutions of wire on the tubular support. With rotation of the shaft 19, the screw shaft 35 is rotated to feed the tensioning device longitudinally of the support 24 so that the convolutions formed on the tubular support lie contiguous to each other. By an adjustment of the tensioning device and an adjustment or change of the driving mechanism as above described, the machine can be varied in its operation to accommodate wires of different gages and in such manner as to insure the proper feeding of the wire to the tubular support and the contiguous arrangement of the convolutions thereon.

When applying the reel 33 to or removing the same from the sleeve 32, it will be clear that by sliding the sleeve along one of the arms 30 or 31 so as to disengage the other arm, the latter can be swung to permit removal of the sleeve and reel from the other arm.

Although I have herein shown and described only one form of wire winding machine embodying my invention, it is to be understood that various changes and modifications may be made herein without departing from the spirit of the invention and the spirit and scope of the appended claims.

What I claim is:

1. A wire winding machine comprising a pair of uprights, means for securing a tubular support to the shaft, a screw shaft journaled in the uprights, a carriage movable on the screw shaft, wire tensioning and guiding means on the carriage, pinions fixed to one end of said shafts, a gear adjustably mounted on one of the uprights to engage and disengage one of the pinions but to maintain engagement with the other pinion, and a third pinion mounted on the upright to be removed from or interposed between said gear and the first pinion.

2. A wire winding machine as embodied in claim 1 wherein the first and third pinions are removably mounted to permit substitution of other pinions of larger or smaller diameter.

3. A wire winding machine as embodied in claim 1 wherein said gear and the third pinion are provided with means for positively securing the same in adjusted position on the upright.

4. In a wire winding machine, a support, a pair of shafts journaled in the support, pinions fixed to said shafts, said support being provided with a pair of slots, a gear meshing with one of the pinions, a pintle adjustable in one of the slots and upon which said gear is supported whereby the gear can be moved into or out of meshing relation with respect to the other pinion, a third pinion, a pintle adjustable in the second slot and supporting said pinion to permit movement of the pinion into or out of meshing relation with respect to the gear of the second pinion, and means by which the pintles can be secured at any point along the length of the slots for maintaining the gear and third pinion in fixed position upon the support.

5. A wire winding machine as embodied in claim 4 wherein said means comprises nuts adjustable on the pintles to clampingly engage or disengage the support, and means carried by the nuts engaging the support for securing the nuts against rotation on the pintles.

6. A wire winding machine as embodied in claim 4 wherein the first and third pinions are removably mounted to permit substitution of other pinions of larger or smaller diameter for the purpose described.

7. A wire winding machine comprising a base, uprights on the base, a shaft journaled on the uprights, adjustable means for securing a tubular support on said shaft, wire tensioning and feeding means movable longitudinally of the shaft and parallel to the tubular support, a reel supporting yoke comprising arms pivoted on the base and a sleeve for detachably securing the arms in one position to support a reel for movement parallel to said shaft.

VINCENT CALABRESE.